United States Patent [19]
Salvatore et al.

[11] Patent Number: 5,310,144
[45] Date of Patent: May 10, 1994

[54] METHOD AND APPARATUS FOR SATELLITE TORQUE BALANCING

[75] Inventors: Jeremiah O. Salvatore, Redondo Beach; Alois Wittmann, Palos Verdes, both of Calif.

[73] Assignee: Hughes Aircraft Company, Los Angeles, Calif.

[21] Appl. No.: 909,260

[22] Filed: Jul. 6, 1992

[51] Int. Cl.[5] ............................................. B64G 1/24
[52] U.S. Cl. ................................................. 244/168
[58] Field of Search .................. 246/158 R, 164, 168, 246/173

[56] References Cited

U.S. PATENT DOCUMENTS

| | | |
|---|---|---|
| 3,304,028 | 2/1967 | Nicklas et al. |
| 4,262,867 | 4/1981 | Piening |
| 4,325,124 | 4/1982 | Renner |
| 4,426,052 | 1/1984 | Hubert et al. |
| 4,508,297 | 4/1985 | Mouilhayrat et al. .............. 244/173 |
| 4,591,116 | 5/1986 | Guenther et al. ................... 244/168 |
| 4,684,084 | 8/1987 | Fuldner et al. ................. 244/158 R |
| 4,732,354 | 3/1988 | Lievre ................................. 244/168 |
| 4,834,325 | 5/1989 | Faget et al. ..................... 244/158 R |
| 4,949,922 | 8/1990 | Rosen |

OTHER PUBLICATIONS

"Solar Sailing Attitude Control of Large Geostationary Satellite" by J. Lievre, IFAC Automatic Control in Space, France 1985.

"Spacecraft Radiation Torques" National Aeronautics and Space Administration, Oct. 1969.

*Primary Examiner*—Galen L. Barefoot
*Attorney, Agent, or Firm*—William J. Streeter; Wanda K. Denson-Low

[57] ABSTRACT

A method and apparatus for balancing environmental disturbance torques acting upon a satellite (10) by tilting the satellite solar panels (14,16) toward or away from the sun to change the solar pressure acting upon the satellite (10) as well as the gravity gradient torque generated by different panel (14,16) tilt angles. By balancing the disturbance torque acting upon the satellite (10), satellite disturbances are minimized so that the satellite stabilization system can be made smaller and fuel used for satellite attitude control is minimized. Torque balancing is accomplished at the beginning of the mission through a linear actuator (37) at the mounting location of each solar panel (14,16) to the satellite main body (12) and, once set, is passive and does not require continuous active satellite control.

16 Claims, 4 Drawing Sheets

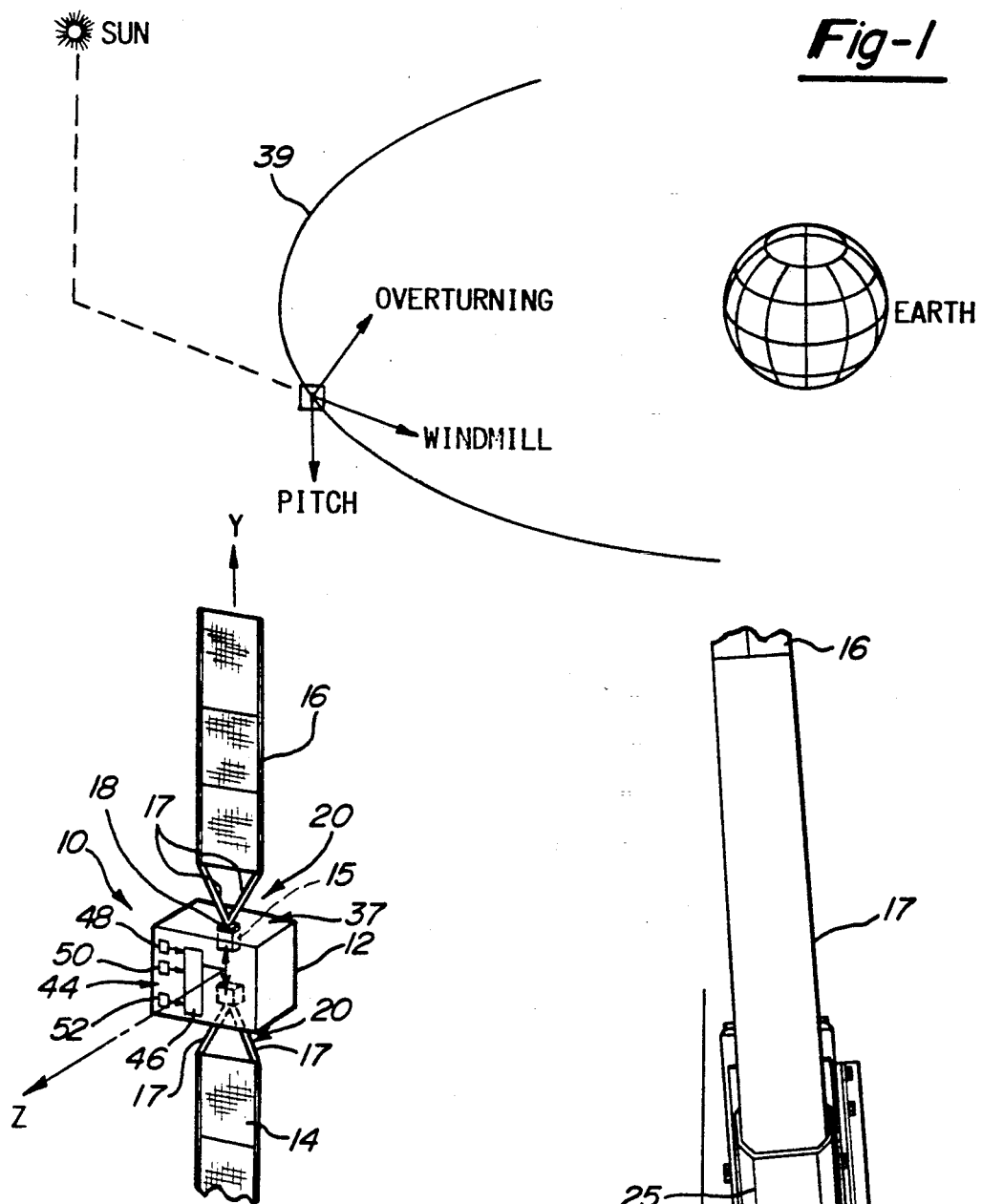
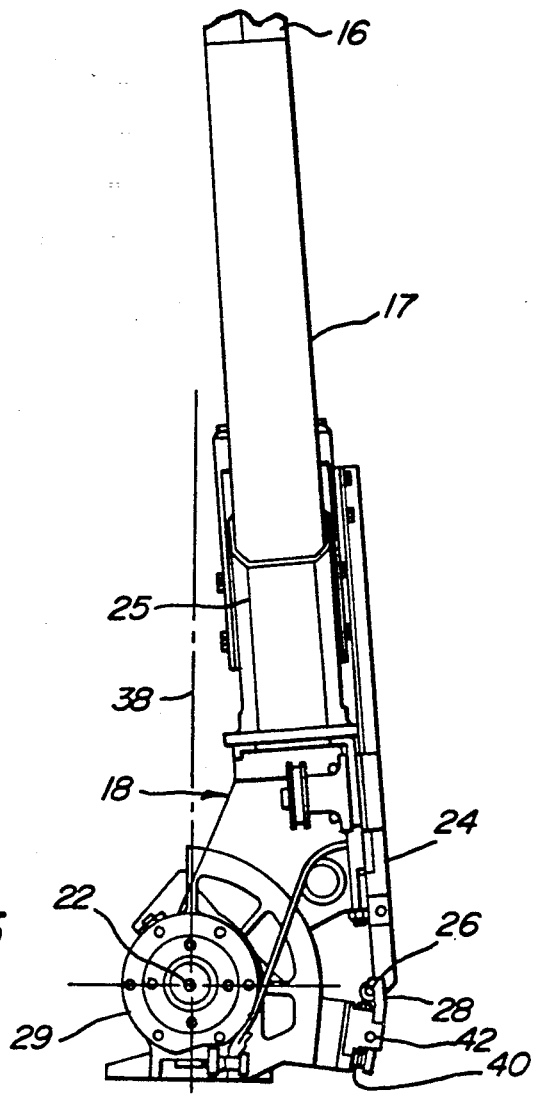
Fig-1
Fig-2
Fig-5

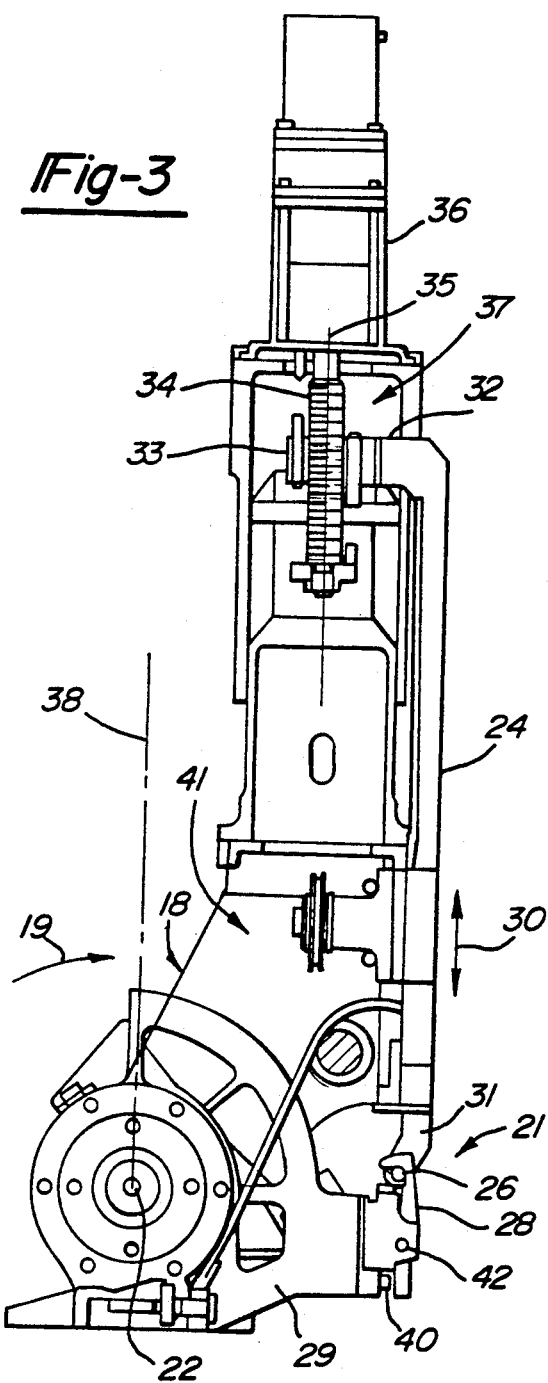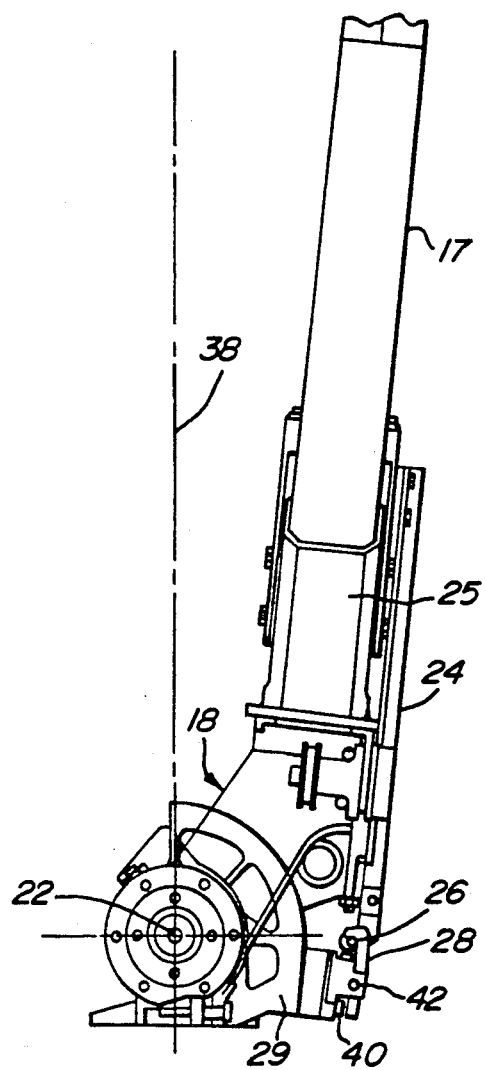

METHOD AND APPARATUS FOR SATELLITE TORQUE BALANCING

BACKGROUND OF THE INVENTION

1. Field of the Invention

The present invention is related to satellite attitude control and in particular to a method and apparatus for balancing secular satellite torques by tilting of the satellite solar panels toward or away from the sun as a means of balancing the environmental disturbance torques applied to the satellite.

2. Description of Related Art

Orbiting satellite are subject to various environmental disturbance torques. For satellites in a geosynchronous orbit, the environmental disturbance torque is primarily due to solar radiation pressure. Photoelectric power generation onboard a satellite requires the exposure of large surface areas to the sun. Nominally, these areas are symmetrically disposed with respect to the satellite center of mass so that the moment of the resultant solar force is zero. However, any misalignments or asymmetries in these areas may result in the creation of a relatively large solar torque. Other environmental effects such as the satellite magnetic dipole interaction with the earth's magnetic field or the torque due to the gravity gradient across an asymmetrical mass distribution are typically made negligible by design. In some cases, they may be used to provide additional control torque to counteract the effects of unwanted environmental disturbance torques.

The net solar pressure torque experienced by a satellite in geosynchronous orbit varies over the course of a day, relative to an inertial reference system, since the central body typically rotates at an orbit rate with respect to the sun, keeping one face of the satellite pointed at the earth. However, the solar torque generated by an asymmetric disposition of the solar panels is essentially constant over a day with respect to an inertial reference system, since the panels maintain a fixed orientation to the sun.

The disturbance torque may be expressed as the sum of two terms: the diurnal average and the remainder after subtracting the average value. The average inertial torque is referred to as the secular torque while the remainder, by definition, is the periodic torque. This distinction is significant since only the secular torque causes a net change in the angular momentum of the system. The periodic torque causes diurnal variation in the angular momentum but the net change which results is zero. If the satellite attitude control system is properly designed, the change in angular momentum due to environmental disturbance torques is absorbed by the momentum management system of the satellite which must be capable of handling both the secular and periodic torques. When the angular momentum storage capacity of the momentum management system is reached, the stored angular momentum must be "dumped", typically by using the reaction control system to restore the net system angular momentum to zero or a desired momentum (bias) state. Because of the degradation in pointing accuracy during thruster activity, the angular momentum storage capacity of the satellite is typically sized to provide an interval between angular momentum dumps which is the same as the required stationkeeping interval.

In general, the secular torque may be resolved into three orthogonal inertia components with reference to the sun: overturning, windmill and pitch. The overturning and windmill components are in the orbit plane, with the windmill component being along the projection of the sun line and the overturning component of the torque being perpendicular to the projection of the sun line. The pitch component is along the orbit normal as shown in FIG. 1.

Several factors result in the creation of solar pressure disturbance torques on a satellite such as: a) solar panel alignment and variation in solar cell reflectivity; b) solar panel deformation due to dry-out and thermal expansion; c) antenna reflector and satellite body geometry; and d) differences in the satellite center of mass and center of environmental force application. The uncertainty in defining contributions from the sources is large and therefore, satellites typically require powerful attitude control torque systems such as magnetic torque systems, large momentum and/or reaction wheels, large area variations in solar sailing systems, etc.

One approach to producing a counteracting overturning torque on a satellite is to vary the distances by which the solar panels extend from the satellite body. Thus, the forces produced by the solar radiation pressure on the panels act upon the satellite over two lever brackets of different lengths and thereby produces an overturning torque on the satellite. The same effect can be achieved by making the solar panels foldable and unfoldable, like an accordion, to vary the area of the solar panel and also the location of the area center relative to the satellite center of mass. To move the solar panels in or out from the satellite body however, requires a relatively complex mechanism.

Another approach to counteracting the secular overturning torque is to rotate one of the solar panels about its sun tracking axis relative to the opposite solar panel to effect the solar panel configuration and thus producing a counteracting overturning torque acting on the satellite. Such a method however produces a windmill torque which must be compensated for by either the satellite attitude control system or by alternatingly producing negative and positive windmill torques by rotating the solar panels in the opposite direction. Since the secular overturning torque is a constant value over the course of a day, it is necessary to perform a compensating maneuver periodically throughout the day to maintain proper attitude control.

It is an object of this invention to overcome the difficulties with the known methods for producing a torque to counter disturbance torques.

It is another object of the invention to compensate for the secular overturning torque with a balancing maneuver to eliminate continued torque compensating maneuvers.

SUMMARY OF THE INVENTION

In accordance with the teachings of the present invention, the secular environmental disturbance torques acting on the satellite are balanced by first measuring satellite disturbance torque due to environmental forces in orbit and then tilting the satellite solar panels relative to the satellite body by rotation about an axis parallel to the overturning torque vector to achieve torque balance for the satellite. Both solar pressure torque and gravity gradient effects are utilized for such torque balancing with only a modest solar panel power degradation associated with the panel tilting. Torque balancing preferably is accomplished after initial in-orbit satellite check out and prior to mission start.

Environmental disturbance torque balancing enables precise satellite attitude control to be maintained without expending fuel and more importantly, without requiring a large active momentum stabilization system for the satellite. The advantage of torque balancing is that satellite disturbances are minimized when sizing a momentum stabilization system so that the stabilization system can be made smaller. By minimizing or eliminating secular torques, fuel used for satellite attitude control is reduced. An advantage of the torque balancing is its passive character, that is, it is balanced once at mission start, compared to continuous active satellite control by solar sailing, magnetic torquing, low thrust pulsing, etc.

The method of the present invention is operable on a satellite orbiting the earth in an orbit plane having a main body, a pair of solar panels extending from the main body in opposite directions relative to the normal plane in deployed positions with the panels facing the sun. In the deployed position the panels are oriented at an angle relative to a line normal to the orbit plane and the satellite includes a tilting mechanism for rotating the solar panels about axes parallel to the direction of the overturning torque vector for variable orienting the panels relative to the normal line while in the deployed position. As a result, the net secular overturning torque acting on the satellite caused by solar pressure and gravity gradient forces on the panel can be minimized.

According to the method of the present invention, the disturbance torque acting on a satellite in earth orbit having a pair of solar panels extending from the main body of the satellite in opposite directions relative to the orbit plane and oriented at an angle relative to a line normal to the orbit plane is balanced by: 1) measuring the net overturning torque acting on the satellite; 2) determining the desired solar pressure and gravity gradient forces for acting on the solar panels to minimize or eliminate the overturning torque on the satellite; 3) determining a desired angle of orientation for each panel relative to the normal line to achieve the desired solar pressure and gravity gradient force on the panels; and 4) tilting the panels toward or away from the sun to achieve the desired angle of orientation of the panels relative to the normal line to the orbit plane. This is accomplished by providing the satellite with a tilting mechanism located at the base of the solar panels which rotates with the solar panels for sun tracking and allows the solar panels to be tilted toward or away from the sun.

A linear actuator mounted at the base of the panels and arranged to be in alignment with the existing latch of the solar panel deployment drive essentially alters the latch position, that is, the panel tilt. While deployment and latching of the panel are not effected by the presence of the linear actuator, the panel bending frequency however, will be somewhat decreased because of the actuator stiffness. Balance setting is only required at mission start for a satellite with fixed apertures and center of mass. However, center of mass change due to mission fuel depletion may suggest occasional updating of the balance setting during the satellite mission should the secular disturbance torque exceed a given value.

Further objects, features and advantages of the invention will become apparent from a consideration of the following description and the appended claims when taken in connection with the accompanying drawings.

BRIEF DESCRIPTION OF THE DRAWINGS

FIG. 1 is a schematic view illustrating an inertial reference system;

FIG. 2 is a perspective view of the satellite containing the torque balancing apparatus of the present invention;

FIG. 3 is a side view of a solar panel mounting bracket;

FIGS. 5 and 6 are side views of the solar panel bracket of FIG. 2 in various panel tilt positions.

DETAILED DESCRIPTION OF THE INVENTION

With reference to FIG. 2, a satellite 10 is shown having a body 12 with a pair of solar panels 14 and 16 extending therefrom. Satellite 10 is intended for orbit about the earth in a geosynchronous orbit with the z axis oriented toward a fixed location on the earth's surface. In orbit, the panels extend in opposite directions from the orbit plane. The two solar panels 14 and 16 are rotatable about the longitudinal axis y so as to remain facing the sun during the orbit of the satellite 10 about the earth and are driven by sun tracking drive mechanisms 15, at the base of each panel.

Figure 7:
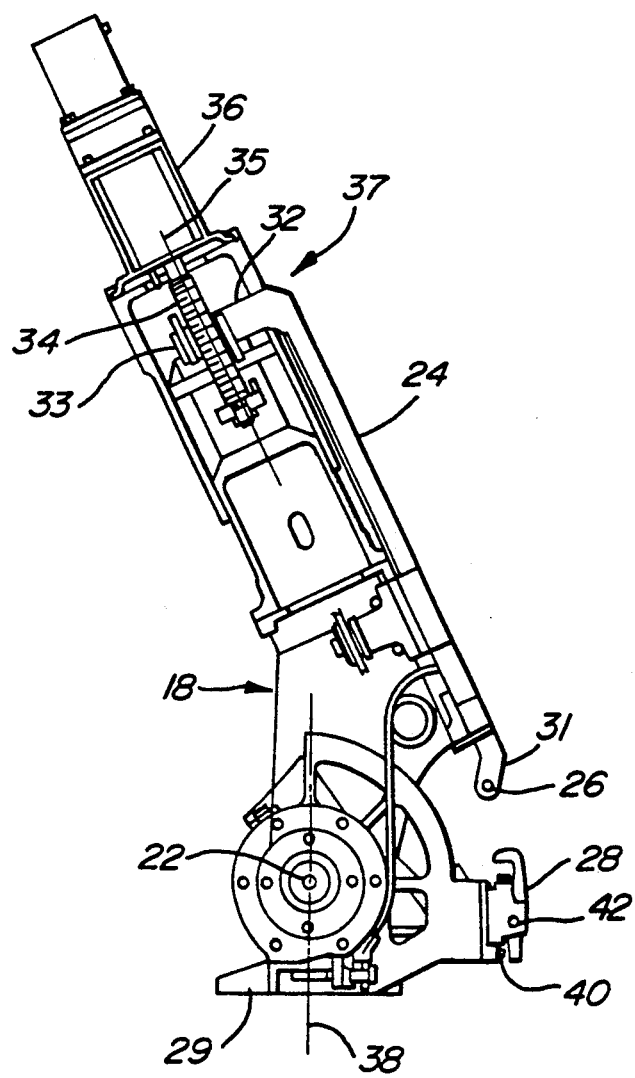
FIG. 7 is a side view of the solar panel bracket in an unlatched position during rotation to the use position.

Each of the solar panels 14 and 16 are mounted to the satellite body 12 by a panel bracket 18. Identical brackets 18 are used for each of the panels. The panels are attached to the brackets 18 by yokes 20 with each leg 17 of the yokes 20 being inserted into sockets 25 of the brackets 18. Each bracket 18 is mounted for rotation at a pivot 22 (FIG. 3) having an axis of rotation 23. During satellite launch, the panels and brackets are in a stowed position in a well known manner. After launch, the brackets are rotated about pivot 22 as shown by arrow 19 from the stowed position to a use position by deployment drive 41 in a well known manner. During rotation of the brackets, the solar panels are unfolded to deployed positions. A latch 21 is used to hold each bracket 18 in the use or deployed position at an angle relative to the line 38 which is normal to the satellite orbit plane 39. FIG. 7 illustrates the bracket 18 in an unlatched position during rotation from the stowed to use positions. The pivot 22 is part of a panel bracket mounting base 29 that is carried by a sun tracking drive mechanism 15 rotating the panels 14 and 16. As a result, the axis 23 of the pivot 22 is always positioned normal to the sun line and parallel to the direction of the overturning torque vector (FIG. 1).

Figure 4:
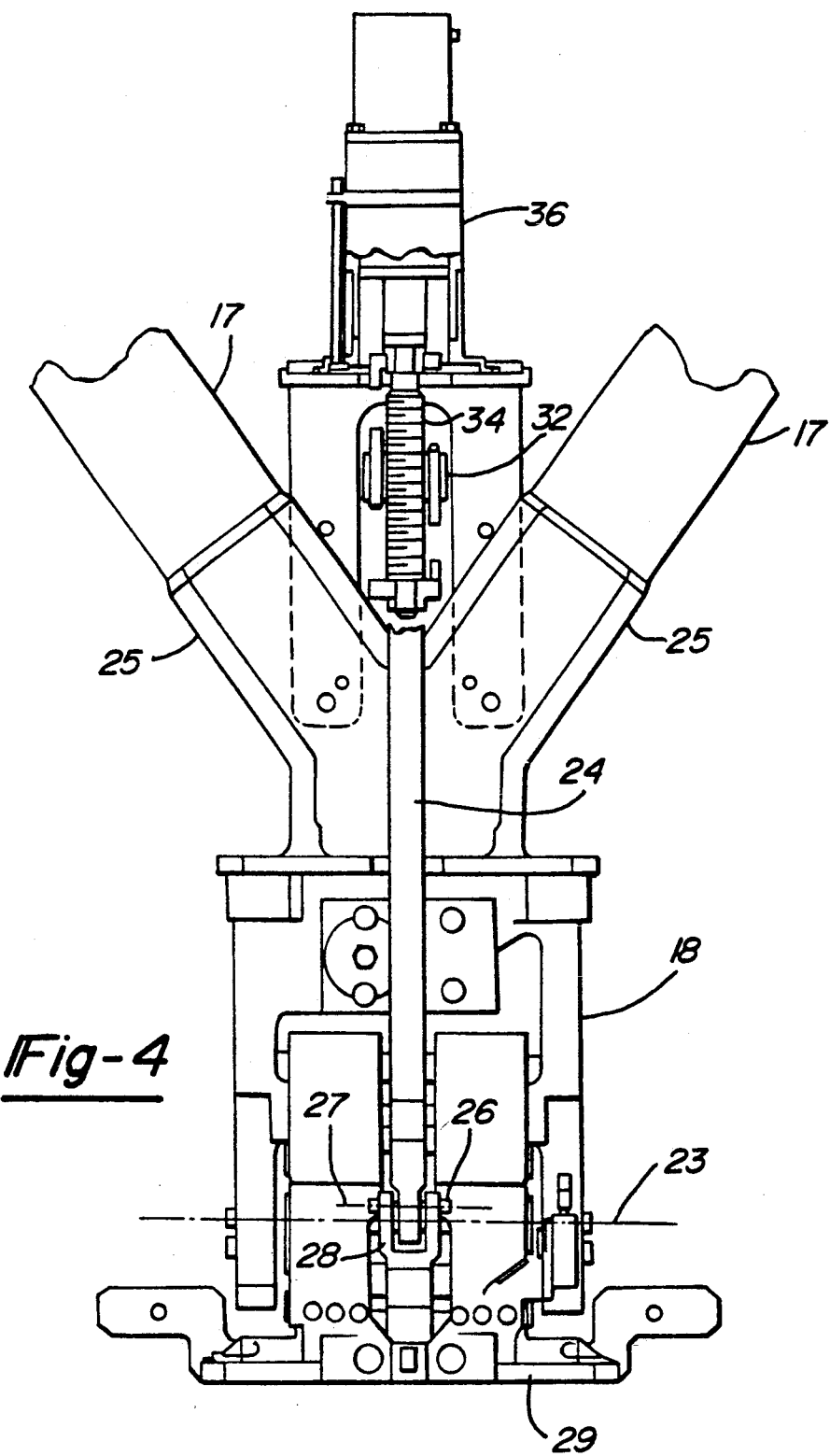
FIG. 4 is a plan view of the solar panel bracket of FIG. 3.

Latch 21 includes a spring biased latch hook 28 mounted to the bracket mounting base 29 and spaced from pivot 22. The bracket includes a latch pin 26 which, when the bracket is in the use position, is captured by latch hook 28. Latch hook 28 is rotated about pin 42 and biased into a latching position by spring 40. When captured by the hook, the latch pin 26 is rotatable about its axis 27 (FIG. 4) which is parallel to axis 23 of pivot 22. The latch pin 26 is carried at one end 31 of a slide bar 24 mounted to bracket 18. The opposite end 32 of slide bar 24 is coupled to bracket 18 through a drive mechanism 37 which is shown as a linear drive mechanism comprising a collar 33 threaded onto a jack screw 34. Jack screw 34 is mounted to bracket 18 for rotation about the longitudinal axis 35 of the jack screw which is normal to the axes 23 and 27. Motor 36 drives the jack screw.

The bracket 18, slide bar 24 and mounting base 29 work together to form a three bar linkage. While the bracket 18 can rotate at pivot 22, due to the rigid coupling of the slide bar to the bracket 18, the bracket is fixed in place. However, upon rotation of jack screw 34, the slide bar 24 is moved linearly along the screw axis 35 as shown by arrow 30 (FIG. 3). This changes the effective length of the bracket 18 in the three bar linkage, causing the bracket to rotate about axis 23. This enables the orientation of the bracket and solar panel to be varied relative to the line 38 normal to the orbit plane 39. Three positions of the bracket 18 are shown in FIGS. 3, 5 and 6. In FIG. 3 the bracket is extending substantially parallel to the normal line 38 while in FIG. 5 the bracket 18 has been rotated slightly toward the normal line 38 and in FIG. 6 the bracket 18 has been rotated away from the normal line 38. The use of a linear drive mechanism as described to rotate the panels is only one of several different types of drive mechanisms that can be employed.

A satellite, once deployed in orbit, may exhibit large attitude disturbance torques due to area misalignments and environmental force uncertainties even though, by best design effort, the satellite is configured for balanced secular torque and minimized diurnally varying torque. Typically, solar panel misalignment is a prominent source for upsetting the torque balance. In geosynchronous orbit, solar radiation pressure on the panels is the largest source of environmental disturbance torque. The environmental disturbance torque acting on the satellite is measured by evaluating the satellite attitude response over time. By changing the angle of the panels relative to the orbit normal, the solar pressure forces acting on the panels and thereby, the solar pressure torque on the satellite can be changed. Once the panels have been deployed at mission start, changing the tilt of the panels by rotating the panels about the axis 23, parallel to the overturning torque vector enables, the total overturning disturbance torque on the satellite to be balanced. The linear drive of the jack screw and slide bar at the satellite/solar panel interface tilts the panels toward or away from the sun an amount necessary to achieve torque balance. When tilting the panels to change the solar pressure torque, gravity gradient torque is also affected and its use for satellite torque balancing is reflected in selecting bracket 18 rotation angles.

Ideally a one time calibration of panel tilt angles will suffice though the drive mechanism 37 provides for multiple uses. The drive mechanism is not used for panel deployment and panel power generation such that failure of the drive mechanism to operate properly does not impair panel deployment or panel use for power generation. In addition, redundancy is provided by having an adjustment drive on both solar panels.

Figure 8:
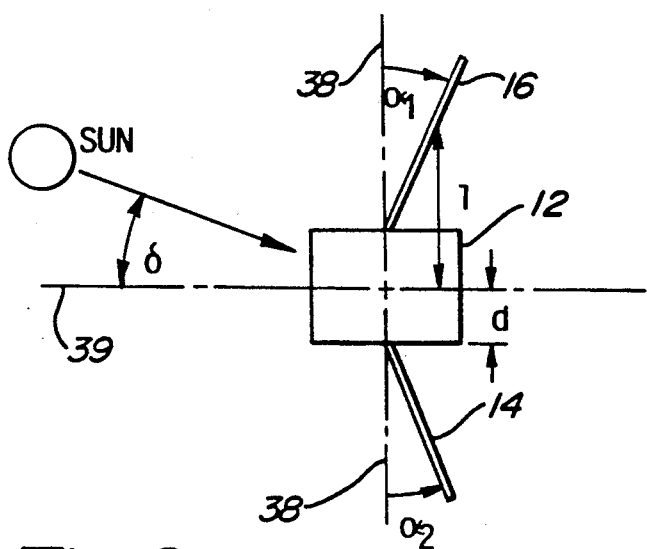
FIG. 8 is a schematic view of a satellite and solar panels illustrating parameters as they are used in determining solar pressure and gravity gradient forces on the satellite.

FIG. 8 illustrates the basic geometry for evaluating solar pressure and gravity gradient torques that are utilized in satellite torque balancing. Panels 14 and 16 extend from the satellite body 12 in opposite directions from the orbit plane 39. The line 38 is normal to the orbit plane. The solar force exerted on each of the solar panels can be expressed in terms of two components, one normal to the panel (the normal solar force) and one parallel to the panel (the shear solar force). The normal components for the two panels can be shown to be:

$$F_{SN1} = \gamma_1 pA [\alpha_1 sin2\delta \alpha_1^2 cos2\delta] \quad (1)$$

$$F_{SN2} = \gamma_2 pA [\alpha_2 sin2\delta + \alpha_2^2 cos2\delta] \quad (2)$$

Where: $F_{SN}$—Solar force normal to solar panels 14 and 16 respectively
Y—Normal force factor to account for non-zero reflectivity and specularity of the panels ($\epsilon 1.3$)
p—Solar radiation pressure constant $= 9.46 \times 10^{-8}$ lb/FT$^2$
A—Area of one solar panel
$\alpha$—Tilt of solar panel from orbit normal ($\alpha$ is small)
$\delta$—Sun elevation relative to the orbit plane If l is the distance from each panel center of pressure to the satellite center of mass, the net overturning moment $T_{SN}$ generated by normal solar force on both solar panels is given by:

$$T_{SN} = l\gamma pA[(\alpha_1+\alpha_2)sin2\delta + (\alpha_2^2-\alpha_1^2)cos2\delta] \quad (3)$$

Where
$\gamma = \gamma_1 = \gamma_2$

The shear component for the two panels can be shown to be:

$$F_{SS1} = \tfrac{1}{2}v_1 pA[\alpha_1 sin2\delta - 2\alpha_1^2 cos2\delta] \quad (4)$$

$$F_{SS2} = \tfrac{1}{2}v_2 pA[\alpha_2 sin2\cdot 2\delta + \alpha_2^2 cos2\delta] \quad (5)$$

Where:
$F_{ss}$—Solar force parallel to solar panels 14 and 16
$v$—Shear force factor to account for non zero reflectivity and specularity ($\approx 0.87$)

If d is the distance from each panel point of tilting to the satellite center of mass, the net overturning moment $T_{SS}$ generated by the shear solar force on both solar panels is given by:

$$T_{SS} = -d\frac{v}{2}pA[(\alpha_1 + \alpha_2)sin2\delta + 2(\alpha_2^2 - \alpha_1^2)cos2\delta] \quad (6)$$

Where $v = v_1 = v_2$

It is evident that the shear torque is smaller than the normal torque and it tends to compensate for the latter. The net overturning torque due to solar pressure is obtained by summing the two components $T_{SS}$ and $T_{SN}$ as follows:

$$T_{SNET} = \quad (7)$$

$$pA\left[\left(\gamma l - v\frac{d}{2}\right)(\alpha_1 + \alpha_2)sin2\delta + (\gamma l - vd)(\alpha_2^2 - \alpha_1^2)cos2\delta\right]$$

The diurnal average gravity gradient torque $T_G$ generated by different panel tilt angles is defined by:

$$T_G = \frac{3}{2}\frac{\mu E}{R^3}(I_z - I_y)sin\frac{\alpha_1 - \alpha_2}{2} \quad (8)$$

Where
$\mu E$—Earth gravitational parameter $6.263 \times 10^4$ NM$^3$/s$^2$
R—Orbit radius (22765NM geo. sync orbit)

$(I_z - I_y)$—Solar panel mass inertial difference about the sun line $I_z$ and panel drive axis $I_y$ Once measured, the net overturning torque $T_{SNET}$ is combined with the gravity gradient torque $T_G$ to determine the net disturbance torque acting upon the satellite. The torque is balanced by determining the appropriate angles $\alpha_1$ and $\alpha_2$ for minimizing the overturning torque acting upon the satellite. Once the desired angles have been determined, the jack screw drive motors 36 are operated to produce the desired solar panel angles $\alpha_1$ and $\alpha_2$. Although the panel angles are set at the beginning of the satellite mission, the satellite can be rebalanced periodically during the mission should change of the satellite center of mass due to fuel depletion warrant rebalancing.

While the invention has been described in the context of a satellite with two solar panels extending in opposite directions from the orbit plane, the invention can be practiced on satellites having only one or more than two panels. In the case of only one panel, the panel is balanced against the satellite body.

The tilting of the solar panels is accomplished by an onboard attitude control system 44. The control system includes an attitude control processor 46 which is a programmable digital processor. The processor 46 normally receives information from earth sensor 48 and RF sensor 50. A command receiver 52 receives commands originating from earth related to commanded changes in attitude and provides these to the processor 46. Processor 46 is linked to the jack screw drive motors 36 for accomplishing the desired change in the solar panel tilt angled relative to the orbit plane normal.

It is to be understood that the invention is not limited to the exact construction and method illustrated and described above, but that various changes and modifications may be made without departing from the spirit and scope of the invention as defined in the following claims.

We claim:

1. A satellite for orbiting the earth in an orbit plane about the earth with a sun based inertial reference system centered at said satellite having mutually perpendicular overturning, windmill and pitch axes, with the windmill axis being along the projection of the sun line in the orbit plane, said overturning axis being in the orbit plane and normal to the windmill axis, and said pitch axis extending perpendicular to said orbit plane, said satellite comprising:

a main body;

at least one solar panel extending from said main body out of the orbit plane in a deployed position with said panel facing the sun; said panel having proximal and distal ends relative to said main body and said panel in said deployed position being oriented at an angle relative to a line normal to said orbit plane; and tilting means for rotating said panel about a tilt axis parallel to the overturning axis and adjacent said proximal end for variably orienting said panel relative to aid normal line in said deployed position whereby said panel is tilted to move said distal end toward or away from the sun and solar pressure and gravity gradient forces on said panel can be varied in order to minimize overturning torque acting on said satellite about said overturning axis.

2. The satellite of claim 1 wherein said tilting means includes:

a panel mounting bracket coupled to said body at one end for rotation about said tilt axis and means for mounting said panel at the opposite end of said bracket;

a support link having two ends and coupled at one end to said body for rotation about a second axis parallel to said tilt axis and spaced therefrom, coupling means for attaching the opposite end of said link to said bracket at an attachment point spaced from both said tilt axis and said second axis thereby forming a three bar linkage; and actuator means for varying the distance between said attachment point and said tilt axis whereby said bracket is rotated about said tilt axis and the orientation of said panel relative to said normal line is varied.

3. The satellite of claim 2 wherein said actuator means includes linear drive means for moving said attachment point relative to said tilt axis.

4. The satellite of claim 3 wherein said linear drive means includes a jack screw carried by said bracket for rotation about the longitudinal axis of said screw, said screw axis being oriented normal to said first and second axes, said link opposite end being threadably engaged with said jack screw whereby said link opposite end is moved longitudinally along said jack screw upon rotation of said jack screw, and motor means for rotating said jack screw.

5. The satellite of claim 1 further comprising:

sensing means for measuring the attitude change of said satellite in response to environmental disturbance torques acting on said satellite;

processing means, coupled to said sensing means, for determining the desired angle of said panel relative to said normal line to minimize the overturning torque acting on said satellite; and said processing means being coupled to said tilting means for activating said tilting means to rotate said panel to vary the orientation of said panel relative to said normal line to said desired angle.

6. A satellite for orbiting the earth in an orbit plane about the earth with a sun based inertial reference system centered at said satellite having mutually perpendicular overturning, windmill and pitch axes, with the windmill axis being along the projection of the sun line in the orbit plane, said overturning axis being in the orbit plane and normal to the windmill axis, and said pitch axis extending perpendicular to said orbit plane, said satellite comprising:

a main body;

a solar panel extending from said main body out of the orbit plane in a deployed position with said panel generally facing the sun; said panel having proximal and distal ends relative to said main body and said panel in said deployed position being oriented at an angle relative to a line normal to said orbit plane; and means for mounting said panel to said main body including sun tracking means for rotating said panel relative to said body about a rotation axis parallel to said pitch axis to track the sun and tilting means for rotating said panel about a tilt axis parallel to the overturning axis and adjacent said panel proximal end to variably orient said panel relative to said normal line whereby said panel is tilted to move said distal end toward or away from the sun and the overturning torque acting on said satellite can be minimized by varying the solar pressure and gravity gradient forces acting on said panel.

7. The satellite of claim 6 further comprising:

sensing means for measuring the attitude change of said satellite in response to environmental disturbance torques acting on said satellite;

processing means, coupled to said sensing means, for determining the desired angle of said panel relative to said normal line to minimize the overturning torque acting on said satellite; and said processing means being coupled to said tilting means for activating said tilting means to rotate said panel to vary the orientation of said panel relative to said normal line to said desired angles.

8. The satellite of claim 6 wherein said mounting means includes a mounting bracket carried by said sun tracking means for rotation with said panel for tracking the sun and attached to said sun tracking means at one end of said bracket with said solar panel being attached to the opposite end of said bracket;

said bracket having a use position extending from said main body at an angle relative to said normal line; and said tilting means including a pivotal attachment of said bracket one end to said sun tracking means for rotation about said tilt axis to variably orient said bracket and said panel relative to said normal line when said bracket is in said use position.

9. The satellite of claim 8 further comprising:

deployment means for rotating said bracket after satellite launch about said tilt axis to said use position; and latch means for holding said bracket in said use position and fixed from rotation by said deployment means.

10. The satellite of claim 9 wherein said latch means includes a latch hook carried by said sun tracking means and spaced from said tilt axis and a latch pin carried by said bracket defining a latch axis parallel to said tilt axis, said latch pin being engagable with said latch hook in said use position of said bracket in an entrapping relationship, said pin being rotatable relative to said latch hook about said latch axis.

11. The satellite of claim 10 wherein said tilting means includes a slide bar mounted to said bracket for linear motion in a direction normal to said tilt and latch axes, said latch pin being carried by said slide bar and linear drive means for moving said slide bar relative to said bracket whereby said pin rotates within said latch hook and said bracket rotates about said tilt axis.

12. A method of reducing overturning torque acting upon a satellite in orbit about the earth in an orbit plane, said satellite having a sun based inertial reference system centered at said satellite having mutually perpendicular overturning, windmill and pitch axes, with the windmill axis being along the projection of the sun line in the orbit plane, the overturning axis being in the orbit plane and normal to the windmill axis, and the pitch axis extending perpendicular to the orbit plane, the satellite having a main body and at least one solar panel extending from said main body out of the orbit plane and facing the sun, said panel having proximal and distal ends relative to said main body and said panel being oriented at an angle relative to a line normal to the orbit plane, said method comprising the steps of:

a) measuring environmental disturbance torque acting on said satellite in orbit;

b) determining a desired angle of orientation for said panel relative to said normal line to achieve a desired force on said panel to minimize the overturning torque on said satellite; and c) rotating said panel about a tilt axis parallel to the overturning axis at the proximal end of said panel to achieve said desired angle of orientation.

13. The method of claim 12 wherein the environmental disturbance torque is measured by evaluating the satellite attitude response in orbit.

14. The method of claim 12 wherein said desired angle of orientation of said panel relative to said normal line is determined by simultaneously considering solar pressure and gravity gradient effects on said solar panel.

15. The method of claim 14 wherein said satellite has a pair of solar panels extending from said main body in opposite directions out of said orbit plane, said panels being oriented at angles $\alpha_1$ and $\alpha_2$ relative to said normal line, the desired values for $\alpha_1$ and $\alpha_2$ being determined by solving the following equations:

$$T_{SNET} = pA[(\gamma l - vd)(\alpha_1 + \alpha_2)\sin 2\delta + (\gamma l - vd)(\alpha_2^2 - \alpha_1^2)\cos 2\delta]$$

$$T_G = \frac{3}{2} \frac{\mu E}{R^3} (I_z - I_y)\sin \frac{\alpha_1 - \alpha_2}{2}$$

where:

$T_{SNET}$ = net overturning torque acting on the solar panels generated by solar pressure p1 p = Solar radiation pressure constant = $9.46 \times 10^{-8}$ lb/FT$^2$ A = Area of one solar panel $\alpha_1$ = Tilt of solar panel 1 from orbit normal $\alpha_2$ = Tilt of Solar panel 2 from orbit normal $\gamma$ = Normal force factor to account for non-zero reflectivity and specularity of the panels l = The distance from each panel center of pressure to the satellite center of mass $v$ = Shear force factor to account for non zero reflectivity and specularity d = The distance from each panel point of tilting to the satellite center of mass $\delta$ = Sun elevation relative to the orbit plane $T_G$ = The average gravity gradient overturning torque generated by different panel tilt angles $\mu E$ = Earth gravitational parameter $6.263 \times 10^4$ NM$^3$/s$^2$ R = Orbit radius (22765 NM geo. sync orbit) ($I_z - I_y$)—Solar panel mass inertial difference about the sun line $I_z$ and panel drive axis $I_y$.

16. The method of claim 12 further comprising:

repeating steps a), b) and c) periodically when the overturning torque acting on said satellite exceeds a predetermined value.

* * * * *